United States Patent [19]

Eddy et al.

[11] 4,249,479

[45] Feb. 10, 1981

[54] FLUID DISPENSING APPARATUS FOR USE WITH A CONTAINER ASSEMBLING MACHINE OR THE LIKE

[75] Inventors: William R. Eddy, Kansas City, Mo.; Frank P. Richards, Prairie Village, Kans.

[73] Assignee: Phillips Petroleum Company, Bartlesville, Okla.

[21] Appl. No.: 55,660

[22] Filed: Jul. 6, 1979

[51] Int. Cl.³ .......................... B05C 1/02; B05C 5/02; B05C 7/06

[52] U.S. Cl. .................................. 118/708; 118/241; 118/410; 118/408

[58] Field of Search ............... 118/708, 410, 408, 241, 118/263, 215, DIG. 3; 417/477

[56] References Cited

U.S. PATENT DOCUMENTS

| | | | |
|---|---|---|---|
| 1,071,637 | 8/1913 | Ford | 118/708 X |
| 2,334,148 | 11/1943 | Jones | 417/477 |
| 2,804,023 | 8/1957 | Lee . | |
| 2,975,719 | 3/1961 | Kaufman . | |
| 3,045,870 | 7/1962 | Danziger et al. . | |
| 3,078,821 | 2/1963 | McEwen | 118/708 |
| 3,232,496 | 2/1966 | Rockwell, Jr. et al. . | |
| 3,807,131 | 4/1974 | Samson et al. . | |
| 4,072,226 | 2/1978 | Richards et al. . | |

*Primary Examiner*—John P. McIntosh

[57] ABSTRACT

An improved apparatus for supplying fluid such as liquid lubricant or glue to a partially assembled container during assembly thereof. The apparatus employs a flexible tube pump driven by a reciprocatable frame or structure on a container assembling machine via a lever arm acting through a one-way clutch assembly to thereby rotate the tube pump rotor in successive increments of rotation of less than 360°. In one embodiment, apparatus is disclosed in which a liquid dispensing head is reciprocated into and out of engagement with a partially assembled container by means of a reciprocatable frame and actuation of the flexible tube pump is obtained after such engagement in response to additional movement of the frame relative to the liquid dispensing head. In another embodiment, means are disclosed for preventing dispensing of liquid when a container will not be present at the liquid dispensing station.

15 Claims, 6 Drawing Figures

FLUID DISPENSING APPARATUS FOR USE WITH A CONTAINER ASSEMBLING MACHINE OR THE LIKE

The invention relates generally to improvements in packaging apparatus. In one aspect the invention relates to apparatus for assembling containers. In another aspect the invention relates to apparatus for dispensing a predetermined amount of liquid on a partially assembled container. In yet another aspect the invention relates to apparatus for preventing the dispensing of liquid when a partially assembled container is not in the proper position for receiving such liquid.

Many types of pressure pots and valves as well as small piston and check valve systems have been used for metering small amounts of liquid lubricants and glues in the fabrication and mass production of packaging components. Such apparatus have proved to be unreliable and inconsistent due to the complexity of their design and to unacceptable variations in pressure applied to the pressure pots. When glues are being handled by such apparatus, frequent cleaning of the complicated mechanisms is necessary to avoid inconvenient and costly production stoppages. It is of extreme importance in the assembly of containers that the quantity of glue and/or lubricant dispensed be controlled with a high degree of consistency. The dispensing of excessive glue can cause the production of unacceptably unattractive containers while insufficient glue can cause production of containers of unacceptable strength at the glue joint. Similarly, the dispensing of excessive lubricant prior to a container curling or flaring operation can cause production of an unacceptably finished container while insufficient lubricant can cause actual destruction of containers due to excessive heating of the container by the friction generated by a rotating curling or flaring head contacting the container in a container finishing operation.

The present invention contemplates apparatus for supplying a predetermined quantity of fluid from a source of said fluid to a location, and comprises flexible tube means for conveying a quantity of fluid therethrough to an outlet end portion thereof, at least a portion of said tube means being positioned in a generally circular loop. The apparatus additionally includes support means operatively related to said flexible tube means for supporting the loop and shaft means having first and second end portions and journaled on the support means for rotation about an axis of rotation generally coaxial with the loop. The apparatus further includes pressure member means drivingly connected to the first end portion of the shaft means for rotation therewith and body means carried by the support means and disposed about the loop and the pressure member means and having a generally circular inner surface located sufficiently close to the pressure member means and the loop so that the tube means is pinched between the pressure member means and the inner surface whereby the rotation of the pressure member means forces fluid in the loop through the tube means toward the outlet end portion thereof. The apparatus additionally employs one-way clutch means comprising a first portion drivingly connected to the second end portion of the shaft means for rotation therewith; a second portion coaxially aligned with the first portion and adapted to rotate relative to the first portion of the one-way clutch means; and means interconnecting the first and second portions of the one-way clutch means and adapted to provide driving engagement between the first and second portions of the one-way clutch means in response to rotation of the second portion of the one-way clutch means in a first direction about the axis of rotation of the shaft means, and, alternately, adapted to drivingly disengage the first and second portions of the one-way clutch means in response to rotation of the second portion of the one-way clutch means in an opposite direction about the axis of rotation of the shaft means. The apparatus also includes actuator means drivingly connected to the second portion of the one-way clutch means for rotating the second portion of the one-way clutch means about the axis of rotation of the shaft means.

The present invention solves the problems of the prior art in the dispensing of liquid lubricant, glue or the like by providing a tube-type pump and means for actuating the pump in precise predetermined increments, and further provides means for preventing the dispensing of such liquids when no container is properly positioned for receipt thereof.

It is therefore an object of the invention to provide improved apparatus for supplying a predetermined quantity of fluid from a fluid source to a desired location.

Another object of the invention is to provide improved fluid dispensing apparatus which is simple and reliable in operation.

Yet another object of the invention is to provide improved fluid dispensing apparatus which is easily adjusted for precise dispensing of predetermined quantities of fluid under predetermined conditions.

Still another object of the invention is to provide improved fluid dispensing apparatus which is well adapted for dispensing precise quantities of liquid lubricant, liquid glue or other desired liquid.

Another object of the invention is to provide improved fluid dispensing apparatus which is inexpensive to construct, easy to maintain and economical to operate.

Other objects, aspects and advantages of the present invention will be readily apparent from the following detailed description, claims and drawings in which:

Figure 1:
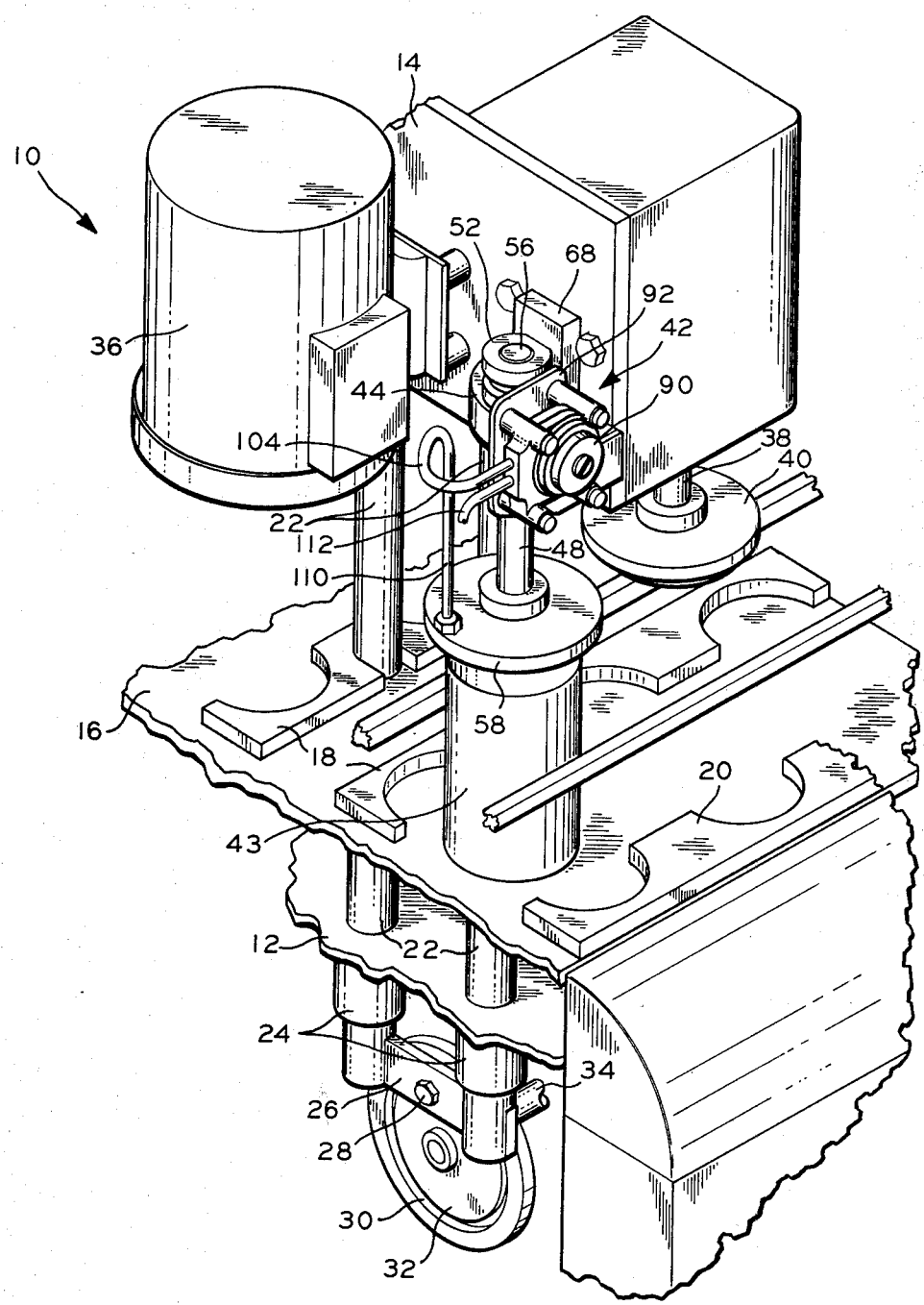
FIG. 1 is a partial isometric view of a container assembling machine illustrating a lubricating station and a curling station with the lubricating station employing lubricant pumping means constructed in accordance with the present invention.
Figure 2:
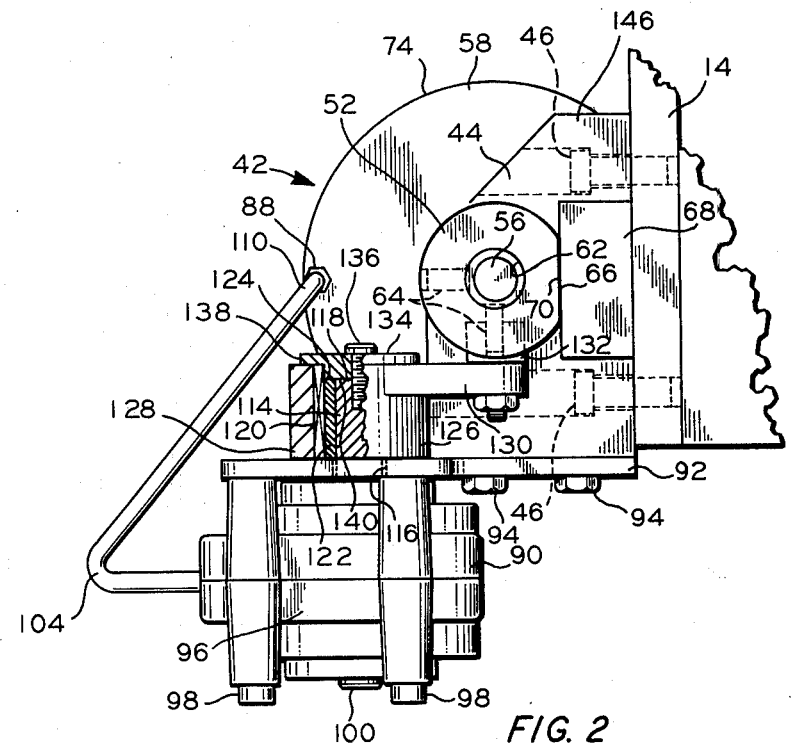
FIG. 2 is an enlarged partial top plan view of the machine of FIG. 1 illustrating construction details of the lubricant pumping means with portions thereof broken away to facilitate understanding.
Figure 3:
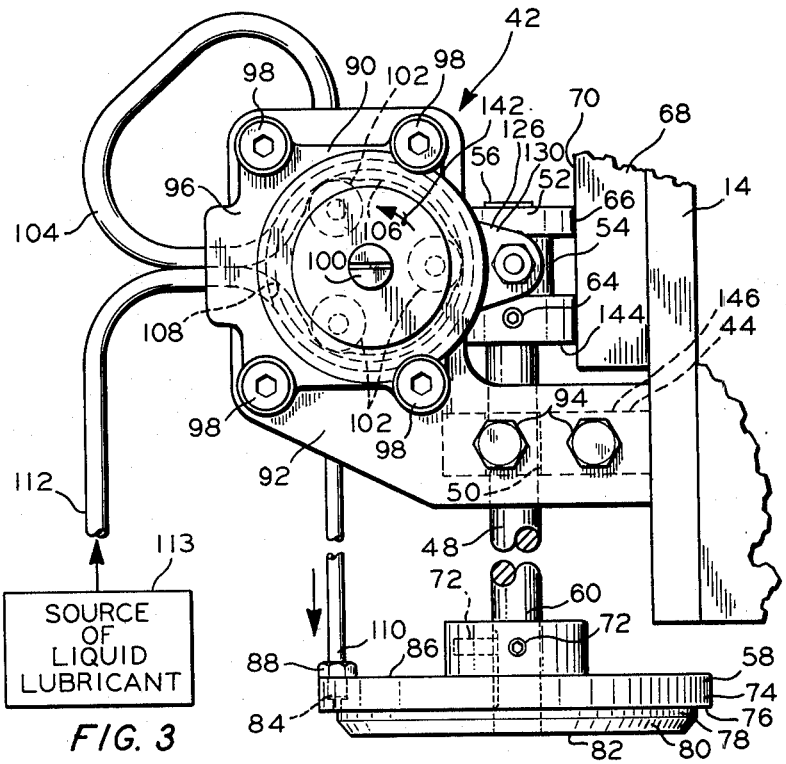
FIG. 3 is an enlarged partial side elevation view of the machine of FIG. 1 further illustrating construction details of the lubricant pumping means.

Referring now to the drawings, and to FIGS. 1, 2 and 3 in particular, a container assembling machine is partially illustrated therein and is generally designated by the reference character 10. The machine 10 comprises a base 12 and a reciprocatable frame 14. The base 12 includes a substantially horizontal container supporting plate 16 and container engaging jaws 18 and 20. The container engaging jaws 18 are rigidly secured above the surface of the container supporting plate 16 while the container engaging jaws 20 are adapted to move alternately toward and away from the respective container engaging jaws 18 to engage and release containers moving along the supporting plate from one station to another on the container assembling machine.

The reciprocatable frame 14 is mounted on a pair of vertical pedestals 22 which extend through the container supporting plate 16 and are supported in a pair of sliding bearings 24 mounted on the base 12. The lower end portions of the pedestals 22 are rigidly secured together by means of a yoke 26. A cam follower (not shown) is mounted to the yoke 26 by suitable means such as a threaded bolt 28 and is received in a corresponding cam slot 30 of a cam wheel 32 which is drivingly secured to a drive shaft 34 journaled on the base 12 and rotated by suitable drive means (not shown). The cam slot 30 is so configured as to cause vertical reciprocating movement of the reciprocatable frame 14 in response to rotation of the drive shaft 34 and cam wheel 32. A drive motor 36 is mounted on the reciprocatable frame 14 and is connected by suitable drive means, such as a grooved timing belt (not shown), to the drive shaft 38 of a suitable container finishing head 40. The finishing head 40 can be of any suitable type for finishing the open upper end portion of a container such as a flaring head or a curling head. Each finishing head 40 comprises a portion of a curling station on the machine 10. The finishing head and drive shaft are adapted to reciprocate vertically relative to the container supporting plate 16 with the reciprocatable frame 14.

At least one liquid dispensing apparatus 42 is mounted on the reciprocatable frame 14. The liquid dispensing apparatus 42 on the machine 10 is employed to dispense liquid lubricant onto a container 43 prior to the finishing operation, either flaring or curling. The liquid dispensing apparatus 42 forms a portion of the lubricating station of the machine 10.

The liquid dispensing apparatus 42 comprises a mounting bracket 44 which is fixedly secured by suitable means, such as threaded bolts 46, to the reciprocatable frame 14. An elongated member or shaft 48 is slidably positioned in a corresponding aperture 50 extending vertically through the mounting bracket 44 whereby the shaft 48 is adapted to move vertically relative to the bracket 44 along its longitudinal vertical axis generally parallel to the axis of reciprocation of the reciprocatable frame 14. A collar 52 having a circumferential groove 54 formed therein is fixedly secured to the upper end portion 56 of the shaft 48. A liquid dispensing or lubricator head 58 is fixedly secured to the lower end portion 60 of the shaft 48. The collar 52 preferably receives the upper end portion 56 of the shaft 48 through an aperture 62 in the collar 52 and the collar 52 is preferably adjustably secured to the shaft 48 by suitable means such as a pair of set screws 64 received in suitable flat surfaces formed on the exterior of the shaft 48. The collar 52 is further provided with a vertical flat surface 66 extending across the groove 54 and facing the reciprocatable frame 14. A guide block 68 is fixedly secured to the reciprocatable frame 14 adjacent the collar 52 and is provided with a cooperating vertical flat surface 70 which is slidingly engaged by the flat surface 66. The engagement between the collar 52 and the guide block 68 prevents the rotation of the collar, shaft 48 and liquid dispensing head 58 relative to the mounting bracket 44.

The liquid dispensing head 58 is also preferably adjustably secured to the lower end portion 60 of the shaft 48 by means of a pair of set screws 72 which are received in corresponding flat surfaces formed in the outer surface of the lower end portion of the shaft 48. The liquid dispensing head 58 is further provided with a circumferential shoulder 74 having a downwardly facing radial end face 76 communicating therewith. A second circumferential shoulder 78 extends downwardly from the end face 76 and has a diameter less than the diameter of the circumferential shoulder 74. The second circumferential shoulder 78 communicates with a frustoconically shaped surface 80 which extends downwardly and inwardly from the circumferential shoulder 78. The surface 80 terminates with a substantially horizontal downwardly facing end face 82. The diameter of the second circumferential shoulder 78 is selected so as to be closely received within the open upper end face of a partially assembled cylindrical container 43 while the diameter of the circumferential shoulder 74 is substantially greater than the outer diameter of the partially assembled container so that the end face 76 will abut the upper end face of the partially assembled container during the application of lubricant to the container as will be described in greater detail hereinafter.

A passageway 84 extends vertically between the upper surface 86 and the end face 76 of the liquid dispensing head 58. The passageway 84 comprises a relatively small diameter lower portion which intersects both the end face 76 and at least a portion of the second circumferential shoulder 78. The diameter of this lower portion of the passageway 84 can be of any suitable dimension, but a diameter of about 1/32-inch (0.79 mm) provides suitable results with the liquid lubricant presently employed in the invention. The lower portion of the passageway preferably intersects the second circumferential shoulder 78 for a distance of approximately 1/16-inch (1.59 mm) below the end face 76. The upper portion of the passageway 84 is internally threaded to receive an externally threaded tubular fitting 88 by means of which the outlet end portion of tube means for conveying a quantity of liquid lubricant is connected in fluid flow communication with the passageway 84.

A flexible tube pump 90 is mounted on the reciprocatable frame 14 by means of a pump mounting plate 92 which is secured to the mounting bracket 44 by suitable means such as a pair of threaded bolts 94. A suitable flexible tube pump for use in the present invention is available from Cole-Parmer Instrument Company, Chicago, Illinois, and is identified by the trademark Masterflex, and is generally designated by the standard pump head No. 7014. The pump 90 comprises a housing 96 which is fixedly secured to the pump mounting plate 92 by means of four threaded bolts 98. A rotor 100 is journaled in the housing 96 and carries three compression rollers 102 journaled thereon, as best shown in FIG. 3. The rotor 100 and compression rollers 102 comprise what may be referred to as a pressure member. A length of flexible tube 104 is routed through the housing 96 forming a substantially circular loop 106 therein disposed intermediate the compression rollers 102 and a circular inner surface 108 formed in the housing 96. The loop 106 is substantially coaxial with the axis of rotation of the rotor 100. The outlet end portion 110 of the flexible tube 104 is secured in fluid flow communication with the passageway 84 in the liquid dispensing head 58 by means of the fitting 88, while the inlet end portion 112 of the tube 104 is placed in fluid flow communication with a suitable source of fluid to be dispensed by the apparatus 42, such as a source of liquid lubricant 113. A suitable tube for use in the present apparatus is available from Cole-Parmer Instrument Company, is sold under the trademark Tygon, and has an inside diameter of about 0.0655 inch (1.66 mm) and an outside diameter of about 0.1945 inch (4.94 mm).

The rotor 100 includes an input shaft 114 which extends through an aperture 116 in the pump mounting plate 92, as best shown in FIG. 2. The outer end portion of the input shaft 114 is provided with a transverse drive slot 118 formed therein. A one-way clutch assembly 120 is coaxially positioned about the input shaft 114. A suitable one-way clutch assembly for use herein is available from the the Torrington Bearing Company, Torrington, Connecticut, and is designated as a drawn cup clutch and bearing assembly, type RCB121616. Interposed between the one-way clutch assembly 120 and the input shaft 114 is a tubular sleeve 122, also available from the Torrington Bearing Company. The tubular sleeve 122 is provided with a transverse drive slot 124 formed in one end thereof and positioned in registration with the transverse drive slot 118 of the input shaft 114. A pump lever 126, having a hub 128 with a bore therethrough, is drivingly secured to the one-way clutch assembly 120 by suitable means, such as a press fit between the bore of the hub 128 and the outer race or cup of the one-way clutch assembly 120. The pump lever 126 further includes a rigid member or arm 130 which extends radially outwardly from the hub 128 and carries a suitable roller cam follower 132 journaled thereon which is drivingly engaged in the circumferential groove 54 of the collar 52.

The tubular sleeve 122 is drivingly engaged with the input shaft 114 by means of a pump drive key 134 which is secured to the input shaft 114 by means of a threaded bolt 136. The pump drive key further includes a radially extending flange 138 which maintains the pump lever 126 and one-way clutch assembly 120 in proper position on the input shaft 114. The pump drive key 134 includes a key portion 140 which extends from the flange portion 138 toward the pump housing 96 and is drivingly received in the transverse drive slots 118 and 124 of the input shaft 114 and tubular sleeve 122, respectively.

During operation of the container assembling machine 10, partially assembled containers are moved along the container supporting plate 16 by increments from one operating station to the next successive operating station. Details of such movement of partially assembled containers are set forth in U.S. Pat. No. 4,072,226, assigned to the assignee of record of the present application. As each container is positioned in its next respective operating position, the reciprocatable frame 14 is moved downwardly through the action of the drive shaft 34, cam wheel 32, cam slot 30 and yoke 26. With a partially assembled container 43 located in the lubricating station as shown in FIG. 1, the liquid dispensing head 58 engages the container positioned therebelow with the frustoconically shaped surface 80 and circumferential shoulder 78 being received within the open upper end portion of the container and with the end face 76 abutting the upwardly facing end face of the container. At this point it will be seen that the liquid dispensing head 58, shaft 48 and collar 52 are prevented from moving further downwardly relative to the container, while the reciprocatable frame 14 can move a predetermined additional distance downwardly until it reaches the lowermost position along its reciprocating path. As the reciprocatable frame 14 continues to move downwardly after the liquid dispensing head 58 has engaged the container, stopping its downward movement, it will be seen that aperture 50 in bracket 44 permits shaft 48, collar 52 and arm 130 of the pump lever 126 to move upwardly relative to the frame 14 thus cranking the pump lever 126 and thereby rotating the pump rotor 100 through a predetermined angle about the axis of rotation of the rotor in a counterclockwise direction as viewed in FIG. 3 and as shown by the arrow 142. This rotation of the rotor 100 is achieved via the one-way clutch assembly 120 which locks the pump lever 126 on the tubular sleeve 122, which is in turn keyed to the input shaft 114 of the rotor 100. This rotation of the rotor 100 forces a predetermined amount of liquid lubricant through the flexible tube 104 and out the outlet end portion 110 thereof through the passageway 84 and on to the inner surface of the uppermost portion of the container engaged by the liquid dispensing head 58. Continued rotation of the drive shaft 34 causes the reciprocatable frame 14 to commence upward movement relative to the liquid dispensing head 58, which is biased downwardly relative to the frame 14 by any suitable means but preferably by means of gravity acting on the mass of the dispensing head 58, shaft 48, collar 52 and arm 130, until such time as the lower end face 144 of the collar 52 abuts the upper surface 146 of the mounting bracket 44. It will be understood that other biasing means such as compression or tension springs can be employed if desired. Continued upward movement of the reciprocatable frame 14 after such engagement withdraws the liquid dispensing head 58 from the upper end portion of the container, leaving a predetermined quantity of liquid lubricant on the container to facilitate curling of flaring of the container at the next following curling station. The one-way clutch assembly 120 frees or drivingly disengages the pump lever 126 from the input shaft 114 of the rotor 100 when the reciprocatable frame 14 is moving upwardly relative to the collar 52 thus cocking or resetting the pump lever 126 relative to the pump rotor 100 so that another predetermined quantity of liquid lubricant can be dispensed by the apparatus 42 on the next downward movement of the frame 14.

It will be readily apparent that by selecting the inside diameter of the flexible tube 104 and by suitably adjusting the positions of the collar 52 and liquid dispensing head 58 on the shaft 48 as well as suitably adjusting the position of the mounting bracket 44 on the reciprocatable frame 14, the amount of liquid lubricant dispensed upon each downward stroke of the reciprocatable frame 14 can be precisely governed. It will further be noted that in the event of the absence of a container in the lubricating station during a downstroke of the reciprocatable frame 14, no engagement between the liquid dispensing head 58 and a container will be obtained thus preventing the dispensing of liquid lubricant except when a container is in proper position to receive such lubricant. It will also be understood that upon each downstroke of the reciprocatable frame with a container present beneath the liquid dispensing head, the rotor 100 will be rotated about its axis of rotation through a rotational angle of less than 360°, preferably less than 180°, more preferably through a rotational angle in the range from about 15° to about 70°, and still more preferably through a rotational angle in the range from about 40° to about 50°.

Figure 4:
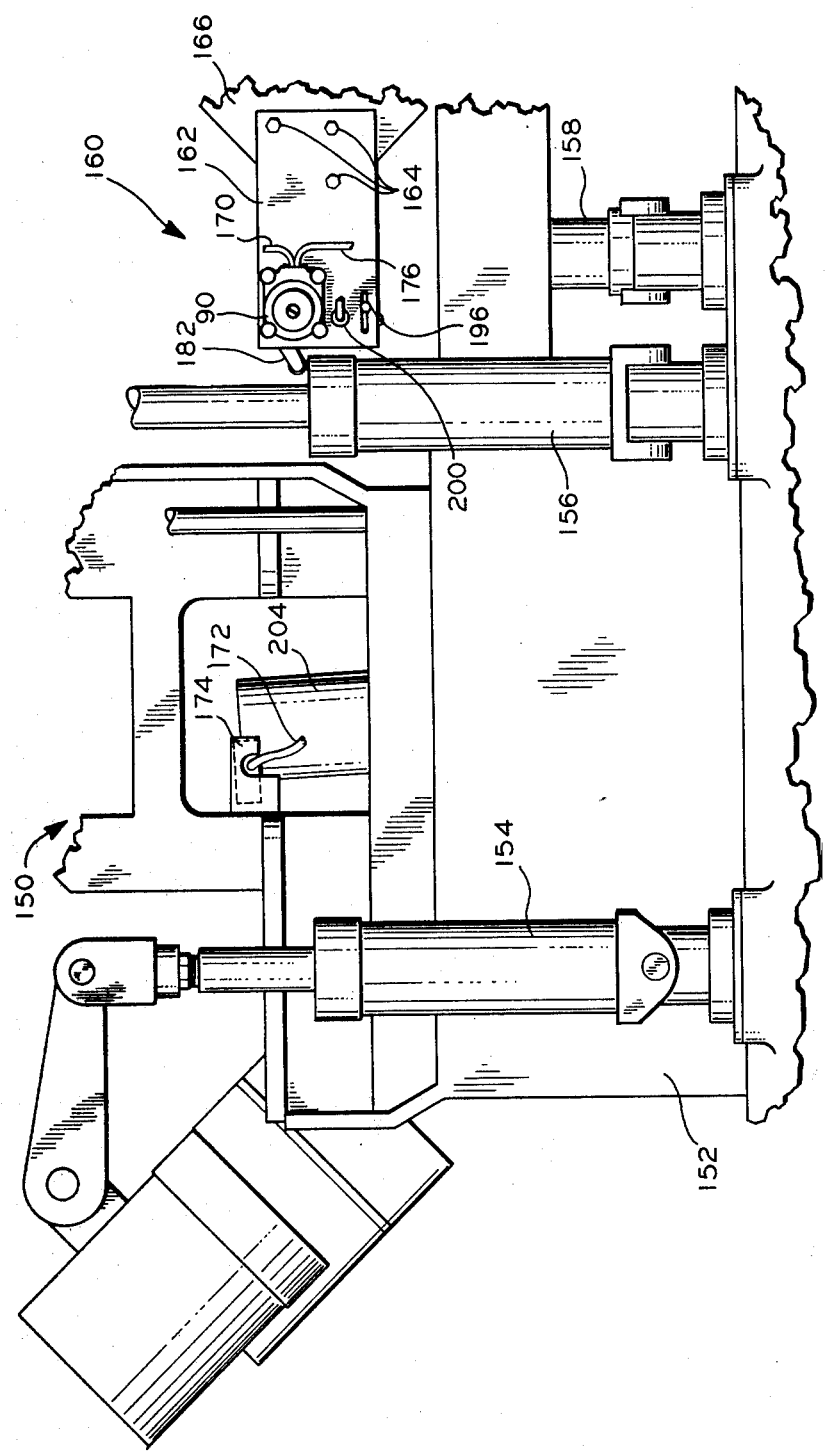
FIG. 4 is a partial side elevation view of another form of container assembling machine illustrating another form of lubricating pump means constructed in accordance with the present invention.
Figure 5:
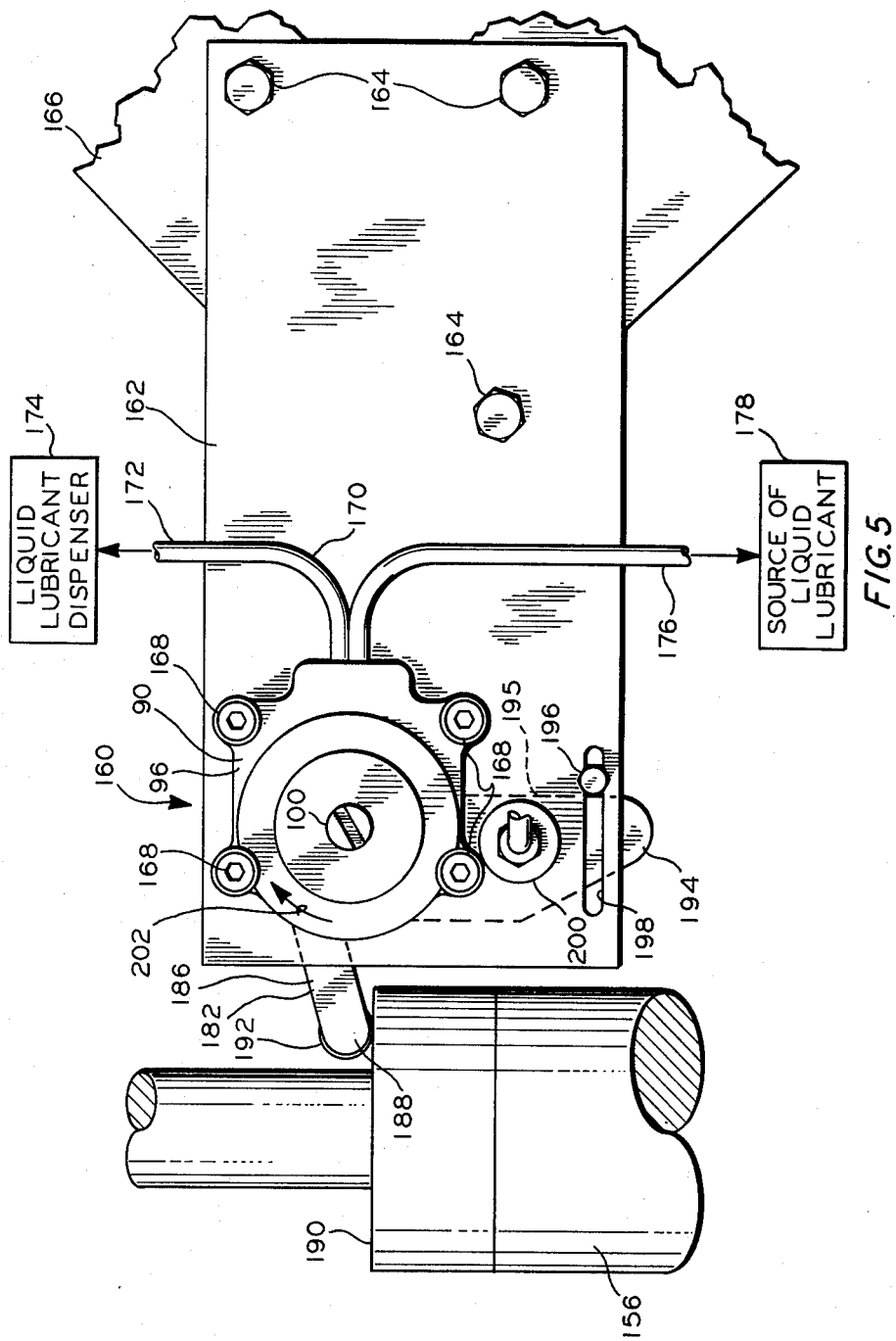
FIG. 5 is an enlarged partial side elevation view of the machine of FIG. 4 illustrating construction details of the lubricant pumping means.
Figure 6:
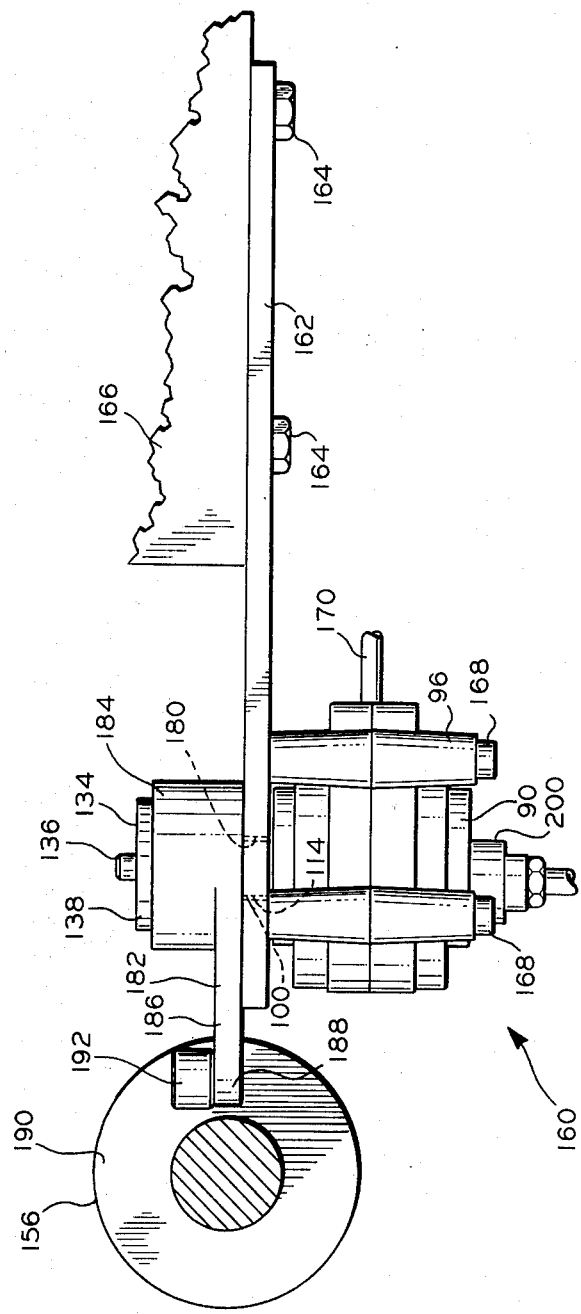
FIG. 6 is an enlarged partial top plan view of the machine of FIG. 4 further illustrating construction details of the lubricant pumping means.

Referring now to FIGS. 4, 5 and 6, another form of container assembling machine is partially illustrated therein and is generally designated by the reference character 150. The machine 150 comprises a base 152 and a plurality of reciprocatable push rods 154, 156 and 158 which serve to operate various articulated operating stations on the container assembling machine 150. Reciprocation of the push rods can be achieved by any suitable means such as by cams driven by a cam shaft journaled on the base 152 (not shown).

At least one liquid dispensing apparatus 160 is mounted on a portion of the base 152 by means of a mounting plate 162 which is mounted by suitable means such as threaded bolts 164 to a portion 166 of the base 152.

A flexible tube pump 90, as described above, is mounted on the mounting plate 162 by means of four threaded bolts 168 extending through corresponding apertures formed in the housing 96. The rotor 100 of the pump 90 is journaled in the housing 96 and carries three compression rollers thereon as described above. A length of flexible tube 170 is routed through the housing 96 forming a substantially circular loop therein disposed intermediate the compression rollers and a circular inner surface formed in the housing 96 as described in detail above. The loop is substantially coaxial with the axis of rotation of the rotor 100. The outlet end portion 172 of the tube 170 is secured in fluid flow communication with a suitable liquid dispenser such as a liquid lubricant dispenser 174 at a remote lubricating station on the machine 150, while the inlet end portion 176 of the tube 170 is placed in fluid flow communication with a suitable source of fluid to be dispensed by the apparatus 160, such as a source of liquid lubricant 178.

The rotor 100 includes an input shaft 114 which extends through an aperture 180 in the mounting plate 162. As previously described and illustrated in FIG. 2, the outer end portion of the input shaft 114 is provided with a transverse drive slot 118. A one-way clutch assembly 120 is coaxially positioned about the input shaft 114, the suitable one-way clutch assembly for this application having been described in detail above. Interposed between the one-way clutch assembly 120 and the input shaft 114 is a tubular sleeve 122, available from the source of the one-way clutch assembly. The tubular sleeve 122 is provided with a transverse drive slot 124 positioned in registration with the transverse drive slot 118 of the input shaft 114. A pump lever 182 having a hub 184 with a bore therethrough is drivingly secured to the one-way clutch assembly 120 by suitable means, such as a press fit between the bore of the hub 184 and the outer race or cup of the one-way clutch assembly 120. The pump lever 182 further includes a rigid member or arm 186 which extends radially outwardly from the hub 184 with the outer end portion 188 engaging an upwardly facing surface 190 of the reciprocatable push rod 156 by a suitable means such as a roller follower 192 journaled on the outer end portion 188. The pump lever 182 further includes a downwardly extending second rigid member or arm 194, having a right edge 195 as viewed in FIG. 5. The mass of the rigid member 194 provides means for biasing the pump lever 182 in a counterclockwise direction about the axis of rotation of the rotor 100 as viewed in FIG. 5.

The tubular sleeve 122 is drivingly engaged with the input shaft 144 by means of a pump drive key 134 which is secured to the output shaft 114 by means of a threaded bolt 136, as shown in FIG. 2. The pump drive key 134 further includes a radially extending flange 138 which maintains the pump lever 182 and the one-way clutch assembly 120 in proper position on the input shaft 114. The pump drive key 134 includes a key portion 140 which extends from the flange 138 toward the pump housing 96 and is drivingly received in the transverse drive slots 118 and 124 of the input shaft 114 and tubular sleeve 122, respectively.

An adjustable threaded bolt and nut 196 is positioned in a slot 198 formed in the lower portion of the mounting plate 162 adjacent the second rigid member 194 of the pump lever 182. The bolt and nut 196 is secured at a predetermined location in the slot 198 so as to engage the rigid member 194 and thereby limit the extent of counterclockwise rotation of the pump lever 182 as viewed in FIG. 5. A power cylinder 200, preferably an air cylinder, is mounted in the mounting plate 162 with the rod end thereof in generally parallel alignment with the rotational axis of the rotor 100 and extendable through an aperture (not shown) in the mounting plate 162. When the cylinder 200 is in its retracted position, the rod end thereof does not extend beyond this aperture in the mounting plate 162, but when the cylinder is extended, the rod end extends beyond the right edge 195 of the rigid member 194 when the pump lever 182 is in its uppermost clockwise position, thus limiting the amount of counterclockwise rotation permitted the pump lever 182 upon the downstroke of the push rod 156. Extension of the cylinder 200 is in response to an indication by controls (not shown) that a container will not be present adjacent the liquid lubricant dispenser 176 upon the next upstroke of the push rod 156, thus preventing the cocking or resetting of the pump lever 182 and thereby preventing the dispensing of liquid lubricant through the outlet end portion 172 of the tube 170 by the pump 90 on the next upstroke of the push rod 156.

During operation of the container assembling machine 150, partially assembled containers are moved along from station to station where various operations are performed on the containers to assemble a complete container. Details of such movement of partially assembled containers are set forth in U.S. Pat. No. 4,072,226, discussed above. As each partially assembled container is positioned adjacent the liquid lubricant dispenser 176, the push rod 156 is moved upwardly thereby driving the rigid member 186 of the pump lever 182 upwardly relative to the input shaft 114 of the pump rotor 100 and thus rotating the rotor 100 through a predetermined angle about the axis of rotation of the rotor in a clockwise direction as viewed in FIG. 5 and as shown by the arrow 202. This rotation of the rotor 100 is achieved via the one-way clutch assembly 120 which locks the pump lever 182 to the tubular sleeve 122, which sleeve is in turn keyed to the input shaft 114 of the rotor 100. This rotation of the rotor 100 forces a predetermined amount of liquid lubricant through the flexible tube 170 and out the outlet end portion 172 thereof and through the liquid lubricant dispenser 176 onto the desired surface of the partially assembled container 204 positioned adjacent the liquid lubricant dispenser. Downward movement of the reciprocating push rod 156 permits counterclockwise rotation of the pump lever 182 which has been released by the action of the one-way clutch assembly 120 from the input shaft 114 of the rotor 100. This counterclockwise rotation is induced, as previously mentioned, by the gravitational bias provided by the rigid member 194 and is limited either by the predetermined position of the bolt and nut 196 in the slot 198, or by the extended rod of the cylinder 200.

It will be readily apparent that by suitably adjusting the position of the bolt and nut 196, the amount of liquid lubricant dispensed upon each upward stroke of the reciprocatable push rod 156 can be precisely governed. It will further be noted that in the event of the absence of a container to be moved into position adjacent the liquid lubricant dispenser 176, the upstroke of the push rod 156 will not effect clockwise rotation of the pump lever 182 and rotor 100 since the cylinder 200 will have prevented counterclockwise rotation of the pump lever 182 preceding the upstroke of the push rod 156.

From the foregoing it will be seen that the present invention provides apparatus which readily meets the objects and provides the advantages of the present invention.

That which is claimed is:

1. Apparatus for supplying a predetermined quantity of fluid from a source of said fluid to a location comprising in combination:
    flexible tube means for conveying a quantity of fluid therethrough to an outlet end portion thereof, at least a portion of said tube means being positioned in a generally circular loop;
    support means operatively related to said flexible tube means for supporting said loop;
    shaft means having first and second end portions and journaled on said support means for rotation about an axis of rotation generally coaxial with said loop;
    pressure member means drivingly connected to the first end portion of said shaft means for rotation therewith;
    body means carried by said support means and disposed about said loop and said pressure member means and having a generally circular inner surface located sufficiently close to said pressure member means and said loop so that said tube means is pinched between said pressure member means and said inner surface whereby the rotation of said pressure member means forces fluid in said loop through said tube means toward the outlet end portion thereof;
    one-way clutch means comprising a first portion drivingly connected to the second end portion of said shaft means for rotation therewith; a second portion coaxially aligned with said first portion and adapted to rotate relative to the first portion of said one-way clutch means; and means interconnecting said first and second portions of said one-way clutch means and adapted to provide driving engagement between the first and second portions of said one-way clutch means in response to rotation of said second portion of said one-way clutch means in a first direction about the axis of rotation of said shaft means, and, alternately, adapted to drivingly disengage the first and second portions of said one-way clutch means in response to rotation of said second portion of said one-way clutch means in an opposite direction about the axis of rotation of said shaft means;
    actuator means drivingly connected to said second portion of said one-way clutch means for rotating the second portion of said one-way clutch means about the axis of rotation of said shaft means;
    reciprocatable frame means fixedly secured to said support means, whereby said support means reciprocates with said reciprocatable frame means; and
    fluid dispensing means movably mounted on said reciprocatable frame means and in fluid flow communication with the outlet end portion of said tube means, said fluid dispensing means being operatively related to said reciprocatable frame means whereby said fluid dispensing means moves with said reciprocatable frame means during reciprocation thereof, said fluid dispensing means being further adapted to cease reciprocating movement when said fluid dispensing means contacts an object upon which fluid is to be dispensed from said fluid dispensing means while said reciprocatable frame means continues reciprocating movement thereby causing relative movement between said fluid dispensing means and said reciprocatable frame means, said fluid dispensing means being further provided with means operatively engaging said actuator means whereby said relative movement between said fluid dispensing means and said reciprocatable frame means results in incremental rotation of said shaft means via said one-way clutch means in said first direction about said axis of rotation.

2. In an apparatus for assembling containers of the type which includes a base; at least one liquid dispensing station on said base; means operatively related to said base for conveying containers to said at least one liquid dispensing station; reciprocatable frame means carried by said base; and means for reciprocating said reciprocatable frame means; the improvement comprising:
    flexible tube means for conveying a quantity of liquid therethrough to an outlet end portion thereof, at least a portion of said tube means being positioned in a generally circular loop;
    support means carried by said base and operatively related to said flexible tube means for supporting said loop;
    shaft means having first and second portions and journaled on said support means for rotation about an axis of rotation generally coaxial with said loop;
    pressure member means drivingly connected to the first end portion of said shaft means for rotation therewith;
    body means carried by said support means and disposed about said loop and said pressure member means and having a generally circular inner surface located sufficiently close to said pressure member means and said loop interposed between said inner surface and said pressure member means so that said tube means in said loop is pinched between said pressure member means and said inner surface whereby the rotation of said pressure member means forces liquid in said loop through said tube means toward the outlet end portion thereof;
    one-way clutch means comprising a first portion drivingly connected to the second end portion of said shaft means for rotation therewith;
    a second portion coaxially aligned with said first portion and adapted to rotate relative to the first portion of said one-way clutch means; and means interconnecting said first and second portions of said one-way clutch means and adapted to provide driving engagement between the first and second portions of said one-way clutch means in response to rotation of said second portion of said one-way clutch means in a first direction about the axis of rotation of said shaft means, and, alternately, adapted to drivingly disengage the first and second portions of said one-way clutch means in response to rotation of said second portion of said one-way clutch means in an opposite direction about the axis of rotation of said shaft means; and actuator means drivingly connected to said second portion of said one-way clutch means for rotating the second portion of said one-way clutch means about the axis of rotation of said shaft means.

3. Apparatus in accordance with claim 2 wherein said actuator means comprises a rigid member having first and second end portions with the first end portion thereof being drivingly connected to the second portion of said one-way clutch means; and wherein the second end portion of said rigid member operatively engages said reciprocatable frame means whereby reciprocating movement of said reciprocatable frame means is transmitted to the second end portion of said rigid member thereby resulting in incremental rotation of said shaft means via said one-way clutch means in said first direction about said axis of rotation.

4. Apparatus in accordance with claim 2 wherein said actuator means comprises a rigid member having first and second end portions with the first end portion thereof being drivingly connected to the second portion of said one-way clutch means; wherein said support means is fixedly secured to said reciprocatable frame means so that said support means reciprocates with said reciprocatable frame means; wherein liquid dispensing means is movably mounted on said reciprocatable frame means adjacent said liquid dispensing station, said liquid dispensing means being operatively related to said reciprocatable frame means so that said liquid dispensing means moves with said reciprocatable frame means during the reciprocation thereof, said liquid dispensing means being further adapted to engage a container positioned in said liquid dispensing station during movement of said reciprocatable frame means toward said liquid dispensing station thereby causing a predetermined amount of relative movement between said liquid dispensing means and said reciprocatable frame means; and wherein said liquid dispensing means is further provided with means operatively engaging said actuator means whereby said relative movement between said liquid dispensing means and said reciprocatable frame means results in incremental rotation of said shaft means via said actuator means and said one-way clutch means in said first direction about said axis of rotation.

5. Apparatus in accordance with claim 3 or claim 4 wherein said rotational angle is less than about 180° about said axis of rotation.

6. Apparatus in accordance with claim 5 wherein said rotational angle is in the range from about 15° to about 70°.

7. Apparatus in accordance with claim 5 wherein said rotational angle is in the range from about 40° to about 50°.

8. Apparatus in accordance with claim 3 characterized further to include adjusting means operatively related to said actuator means for adjusting the angle of said incremental rotation of said shaft means about said axis of rotation.

9. Apparatus in accordance with claim 8 wherein said adjusting means includes means carried by said base and operatively engageable with said rigid member for limiting the rotation of said rigid member in the second direction about said axis of rotation.

10. Apparatus in accordance with claim 3 wherein said rigid member is characterized further to include a roller cam follower journaled on the second end portion thereof, said roller cam follower operatively engaging said reciprocatable frame means.

11. Apparatus in accordance with claim 4 wherein said liquid dispensing means is slidably mounted on said reciprocatable frame means so that said liquid dispensing means is free to slide relative to said reciprocatable frame means a predetermined distance along a line generally parallel with the direction of reciprocation of said reciprocatable frame means.

12. Apparatus in accordance with claim 11 wherein said liquid dispensing means is characterized further to include:

an elongated member having the longitudinal axis thereof aligned generally parallel with the direction of reciprocation of said reciprocatable frame means, and having first and second end portions;

container engaging head means on the first end portion of said elongated member and connected to the outlet end portion of said tube means, said container engaging head means being adapted to engage a container and dispense liquid on said thus engaged container;

means on the second end portion of said elongated member for drivingly engaging the second end portion of said rigid member; and bearing means supporting said elongated member intermediate the first and second end portions of said elongated member and fixedly secured to said reciprocatable frame means, said elongated member being adapted to move along the longitudinal axis thereof relative to said bearing means through a predetermined distance.

13. Apparatus in accordance with claim 12 wherein the second end portion of said rigid member is characterized further to include a roller cam follower journaled thereon; and wherein said means on the second end portion of said elongated member for drivingly engaging the second end portion of said rigid member is characterized further to include a cam groove formed thereon sized and shaped to receive said roller cam follower therein.

14. Apparatus in accordance with claim 2 wherein said flexible tube means is characterized further to include an inlet end portion in fluid flow communication with a source of liquid lubricant.

15. Apparatus in accordance with claim 2 wherein said flexible tube means is characterized further to include an inlet end portion in fluid flow communication with a source of liquid glue.

* * * * *